(12) United States Patent
Ando et al.

(10) Patent No.: US 9,067,793 B2
(45) Date of Patent: Jun. 30, 2015

(54) METHOD FOR PRODUCTION OF CARBON NANOTUBE AND METHOD FOR PURIFICATION OF THE SAME

(75) Inventors: Yoshinori Ando, Nagoya (JP); Xinluo Zhao, Nagoya (JP); Sakae Inoue, Nagoya (JP)

(73) Assignee: Meijo University, Nagoya (JP)

( * ) Notice: Subject to any disclaimer, the term of this patent is extended or adjusted under 35 U.S.C. 154(b) by 768 days.

(21) Appl. No.: 13/225,888

(22) Filed: Sep. 6, 2011

(65) Prior Publication Data
US 2012/0082613 A1 Apr. 5, 2012

Related U.S. Application Data

(62) Division of application No. 12/095,188, filed as application No. PCT/JP2005/021923 on Nov. 29, 2005, now abandoned.

(51) Int. Cl.
| | | |
|---|---|---|
| *C01B 31/02* | (2006.01) | |
| *B82Y 30/00* | (2011.01) | |
| *B82Y 40/00* | (2011.01) | |

(52) U.S. Cl.
CPC ............ *C01B 31/0233* (2013.01); *B82Y 30/00* (2013.01); *B82Y 40/00* (2013.01); *C01B 31/026* (2013.01); *C01B 2202/02* (2013.01)

(58) Field of Classification Search
CPC .................................................... C01B 31/026
USPC ............................................. 423/447.1, 461
See application file for complete search history.

(56) References Cited

U.S. PATENT DOCUMENTS

| | | | |
|---|---|---|---|
| 5,641,466 A | 6/1997 | Ebbesen et al. | |
| 6,735,046 B2 * | 5/2004 | Nakayama et al. | ........... 360/110 |
| 7,108,773 B2 | 9/2006 | Masel et al. | |
| 2003/0007924 A1 | 1/2003 | Goto et al. | |
| 2005/0069669 A1 | 3/2005 | Sakaibara et al. | |

FOREIGN PATENT DOCUMENTS

| | | | |
|---|---|---|---|
| JP | 5123683 A | 5/1993 | |
| JP | 5123684 A | 5/1993 | |
| JP | 748110 A | 2/1995 | |
| JP | 775772 A | 3/1995 | |
| JP | 7197325 A | 8/1995 | |
| JP | 8198611 A | 8/1996 | |
| JP | 2000203820 A | 7/2000 | |
| JP | 2002265209 A | 9/2002 | |
| JP | 200381616 A | 3/2003 | |
| JP | 200389510 A | 3/2003 | |
| JP | 2003121892 A | 4/2003 | |
| JP | 2003277032 A | 10/2003 | |
| JP | 20042103 A | 1/2004 | |
| JP | 2004331477 A | 11/2004 | |
| JP | 2005100757 A | 4/2005 | |
| JP | 2005194127 A | 7/2005 | |
| WO | 2004099072 A1 | 11/2004 | |

OTHER PUBLICATIONS

Ando et al., Mass Production of Carbon Nanotubes by Arc Discharge Evaporation, J. Soc. Mat. Sci. Japan, Apr. 2001, pp. 357-360, vol. 50, No. 4.
Ando et al., Multi-Walled and Singlewall Carbon Nanotubes Produced by Arc Discharge Method, Journal of the Crystallographic Society of Japan, 2001, pp. 353-359, vol. 43, No. 5.
Ando et al., Preparation of Carbon Nanotubes by Arc-Discharge Evaporation, Jpn. J. Appl. Phys., Jan. 15, 1993, pp. L107-L109, vol. 32, Part 2, No. 1A/B.
Ando et al., Sponge of Purified Carbon Nanotubes, Jpn. J. Appl. Phys., Jan. 15, 1998, pp. L61-L63, vol. 37, Part 2, No. 1A/B.
Database WPI Week 200516, XP-002584141, AN 2005-151932, Thomson Scientific, May 31, 2010, 2 pages, London, GB.
"Fenton's reagent", Encyclopedic Dictionary of Chemistry [Kagaku Daijiten], 1964, 4 pages, vol. 7.
Ko et al., Highly efficient microwave-assisted purification of multiwalled carbon nanotubes, Microelectronic Engineering, 2004, pp. 570-577, vol. 73-74.
Office Action re JP Patent Application No. 2004-211889 with English translation, Jun. 18, 2010, 8 pages.
Wang et al., Carbon Nanotubes Grown on the Surface of Cathode Deposit by Arc Discharge, Fullerene Science and Technology, 1996, pp. 1027-1039, vol. 4, No. 5.
Zairyou, Production and Purification of Single-walled and Multiwalled Carbon Nanotubes, May 2001, pp. 15-19, vol. 21, No. 5.
Zhao et al., Morphology of Carbon Nanotubes Prepared by Carbon Arc, Jpn. J. Appl. Phys., Aug. 1996, pp. 4451-4456, vol. 35, Part 1, No. 8.
Zhao et al., Preparation of High-Grade Carbon Nanotubes by Hydrogen Arc Discharge, Carbon, 1997, pp. 775-781, vol. 35, No. 6.
Zhao et al., Raman Spectra and X-Ray Diffraction Patterns of Carbon Nanotubes Prepared by Hydrogen Arc Discharge, Jpn. J. Appl. Phys., Sep. 1998, pp. 4846-4849, vol. 37, Part 1, No. 9A.

* cited by examiner

*Primary Examiner* — Stuart Hendrickson
(74) *Attorney, Agent, or Firm* — The Webb Law Firm

(57) ABSTRACT

The present invention provides a method for producing a carbon nanotube having a high purity and a method for purifying an unpurified carbon nanotube or a carbon nanotube having a low purity. The method for producing a carbon nanotube comprises a step of providing a carbonaceous material containing a carbon nanotube and a step of adding an iron material and hydrogen peroxide to the carbonaceous material to thereby purity a carbon nanotube. It is preferred that an iron powder is used as the iron material. The iron powder is preferably used in a proportion of 0.5 to 20 parts by mass relative to 100 parts by mass of the whole carbonaceous material.

7 Claims, 10 Drawing Sheets

METHOD FOR PRODUCTION OF CARBON NANOTUBE AND METHOD FOR PURIFICATION OF THE SAME

CROSS-REFERENCE TO RELATED APPLICATIONS

This application is a division of co-pending U.S. patent application Ser. No. 12/095,188 filed May 28, 2008, which is a national stage application of PCT/JP2005/021923 filed Nov. 29, 2005, all of which are incorporated herein by reference in their entireties.

TECHNICAL FIELD

The present invention relates to a method of producing high-purity carbon nanotube by purifying unpurified carbon nanotube or low-purity carbon nanotube. The present invention further relates to a high-purity carbon nanotube obtained by this method. The present invention additionally relates to a carbon nanotube-purifying material for purifying carbon nanotube.

BACKGROUND

Carbon nanotube is a novel material that is garnering attention in quite a number of fields due to its excellent properties, e.g., electroconductivity, thermal conduction, mechanical strength, and so forth. Carbon nanotube is generally synthesized (produced) by placing carbon or a carbon source material under high temperature conditions, possibly in the presence of a catalyst. Examples of typical methods for producing carbon nanotube are the arc discharge procedure, laser ablation technique, and chemical vapor deposition process (CVD processes).

The arc discharge procedure is excellent for obtaining low-defect, high-quality carbon nanotube. However, the arc discharge procedure has a lower carbon nanotube yield than the CVD process. To address this, various methods capable of mass production have been introduced. For example, the method disclosed in Patent Document 1 provides an improved carbon nanotube content in the carbon nanotube-containing product; this is achieved by the incorporation of an iron catalyst in the electrode used. A method of producing carbon nanotube using an electrode that incorporates a nickel-yttrium catalyst is described in Non-Patent Document 1. Carbon nanotube can be obtained in higher yields due to the high activity of the nickel-yttrium catalyst.

Patent Document 1: Japanese Patent Application Laid-open No. 2003-277032
Patent Document 2: Japanese Patent Application Laid-open No. 2002-265209
Patent Document 3: Japanese Patent Application Laid-open No. 2003-89510
Non-Patent Document 1: Yoshinori ANDO et al., Journal of the Society of Materials Science, Japan [Zairyo (Material)], Volume 50, Number 4, pp. 357-360 (April, 2001)

However, the carbon nanotube (product) obtained by each of these methods is admixed with impurities such as the catalyst metal and/or a carbon component other than the carbon nanotube (i.e., a carbon component that is not part of the carbon nanotube), e.g., amorphous carbon. This has made it necessary to purify the obtained carbon nanotube in those instances where a higher purity carbon nanotube is desired.

DISCLOSURE OF THE INVENTION

The methods described in, for example, Patent Documents 2 and 3 are already in use for the purification of carbon nanotube. However, there is demand for the production of high-purity carbon nanotube by an even more efficient carbon nanotube purification.

The present invention therefore has as an object the introduction of a method of producing high-purity carbon nanotube by a means that is different from that heretofore used. Viewed from a different perspective, an object of the present invention is to provide a method of purifying unpurified carbon nanotube or low-purity carbon nanotube. Another object is to provide a carbon nanotube-purifying material that is used for the purification of carbon nanotube.

The method of producing carbon nanotube according to the present invention produces a purified carbon nanotube. This method comprises preparing a carbonaceous material that contains carbon nanotube and adding an iron material and hydrogen peroxide ($H_2O_2$) to said carbonaceous material to thereby purify the carbon nanotube.

This "carbon nanotube" is a tubular carbon allotrope (typically a cylinder of the graphite structure) and is not limited to a specific configuration in terms of length and diameter. So-called single-walled carbon nanotube, multi-walled carbon nanotube, and carbon nanohorn having a horn-shaped tube end are typical examples subsumed by the carbon nanotube cited here. The "carbonaceous material" referenced herein is a material that is made up mainly of a carbon component and that contains carbon nanotubes, and the presence of a non-carbon component is not excluded. For example, the carbon nanotube products (unpurified material) obtained by various different methods are typical examples of the "carbonaceous material" referenced here.

The present inventors discovered that the separate addition (that is, from the outside) of hydrogen peroxide ($H_2O_2$) and an iron material to a carbon nanotube-containing carbonaceous material results in a substantial increase in the capacity to oxidize, inter alia, the catalyst metal and the non-carbon nanotube carbon component (impurities such as soot and so forth) present in the carbonaceous material. That is, this method enables the efficient oxidative removal of the non-carbon nanotube carbon component (impurities). This in turn makes it possible to easily obtain high-purity carbon nanotube from carbon nanotube-containing carbonaceous material (which can contain various different impurities) obtained by whatever method.

In a preferred aspect of the method disclosed herein of producing carbon nanotube, the carbonaceous material contains essentially no iron (Fe). Even greater advantage is obtained by the use of the method disclosed herein (that is, the method encompassing purification by the addition from the outside of an iron material and hydrogen peroxide to the carbonaceous material) in such an aspect that uses carbonaceous material that itself does not contain iron.

In a preferred aspect of the method disclosed herein of producing carbon nanotube, the carbonaceous material is obtained by striking an arc discharge between a pair of electrodes wherein at least the positive electrode is a carbon molding (typically rod shaped) that contains at least one metal selected from the group consisting of nickel (Ni), cobalt (Co), and the platinum group elements or that contains an alloy mainly of said metal, and causing the deposition of evaporated material produced from said positive electrode. For example, the carbonaceous material used may be obtained by striking an arc discharge between a pair of electrodes wherein at least the positive electrode is a carbon molding that contains nickel or an alloy mainly of nickel, in order to bring about the evaporation of carbon from this positive electrode, and depositing this carbon.

This arc discharge procedure using an electrode that contains such a nonferrous catalyst metal is advantageous in that it provides a high yield of carbon nanotube per se; however, the product yielded by this procedure has a relatively high content of catalyst metal particles and non-carbon nanotube carbon component impurities (amorphous carbon and so forth) in the stage prior to purification (that is, the material recovered after the arc discharge). In addition, the carbon component impurities can be present strongly bonded to the catalyst metal particles (for example, the carbon component impurities can be present in a thick coating on the catalyst metal particles), and the removal of such impurities has been particularly troublesome. The addition of hydrogen peroxide ($H_2O_2$) and iron (Fe) material in accordance with the present invention enables a facile oxidative removal even of impurities of this nature in which the catalyst metal particles and carbon component impurities are tightly bonded to each other. High-purity carbon nanotube can therefore be efficiently obtained by applying the instant purification treatment to products afforded by the arc discharge procedure cited above.

As an example, iron powder is preferably used as the iron material cited above. The use of iron powder makes it possible to easily and inexpensively add precisely the desired amount of iron (Fe).

The iron particles constituting this iron powder can have an average particle size of less than or equal to 500 nm (typically 50 nm to 500 nm). The use of iron powder having an average particle size no greater than 300 nm (typically 50 nm to 300 nm) is more preferred. The use of iron particles with such a size in particular enables a better manifestation of the effect of increasing the efficiency of oxidative removal of the impurities present in the aforementioned carbonaceous material (purification target).

The iron powder is preferably used in a proportion of, for example, 0.5 to 20 mass parts for each 100 mass parts of the total carbonaceous material. The use of the iron powder in this proportion of addition enables a more efficient purification of the carbon nanotube.

The iron material under consideration may also be an iron-containing carbonaceous material obtained by striking an arc discharge between a pair of electrodes wherein at least the positive electrode is an iron-containing carbon molding and causing the deposition of evaporated material produced from the positive electrode. The use of such an iron-containing carbonaceous material also enables the iron (Fe) to be supplied in an appropriate quantity. This method additionally enables the simultaneous purification of the carbon nanotube present in the iron-containing carbonaceous material.

In a preferred aspect, the aforementioned iron-containing carbonaceous material comprises iron particles that have an average particle size no greater than 100 nm (typically 3 nm to 100 nm, preferably 3 nm to 50 nm, and more preferably 5 nm to 20 nm, for example, 5 nm to 10 nm). The use of an iron-containing carbonaceous material that contains iron particles with such a size in particular enables a better manifestation of the effect of increasing the efficiency of oxidative removal of the impurities present in the aforementioned carbonaceous material (purification target).

The carbon nanotube purification described above can include the further addition of an inorganic acid component. This makes it possible to bring about an increase in the capacity to dissolve away the metal component that may be present in the carbonaceous material that is the treatment target. As a result, carbon nanotubes can be purified more effectively.

This inorganic acid component may be added after the carbonaceous material has been treated by the addition of the hydrogen peroxide and iron material to the carbonaceous material. In this instance, the catalyst metal component that may remain after said treatment and the iron particles originating from the added iron material can be efficiently dissolved away by the addition of this inorganic acid component. Or, the inorganic acid component may be added together with the hydrogen peroxide and iron material. The addition of the inorganic acid component in this manner makes it possible to economize on the quantity of hydrogen peroxide addition or makes it possible to improve the capacity to oxidatively remove the carbon component impurity.

In another aspect, the present invention provides a method of purifying carbon nanotube. A characteristic feature of this purification method is the addition of iron material and hydrogen peroxide to a carbon nanotube-containing carbonaceous material in order thereby to purify the carbon nanotube.

This purification method can be applied to a variety of impurity-containing carbonaceous materials obtained by a variety of production methods and, as described above, enables the purification of carbon nanotube to a high level of purity using a simple method, i.e., addition of iron material and hydrogen peroxide.

The present invention additionally provides a carbon nanotube-purifying material that is used for the purification of carbon nanotube. This purification material comprises iron particles with an average particle size no greater than 100 nm dispersed in a carbon nanotube-containing carbonaceous material.

This carbon nanotube-purifying material is well adapted for obtaining purified carbon nanotube by the treatment of carbon nanotube-containing carbonaceous material obtained by any method. This purification material is typically used by adding it to the aforementioned carbon nanotube-containing carbonaceous material in combination with a suitable oxidizing agent (hydrogen peroxide is particularly preferred). For example, this purification material can preferably be employed as the iron material used in either the carbon nanotube production method or carbon nanotube purification method described in the preceding. Since such microfine iron particles are prone to aggregate by themselves, they are deployed in the subject carbon nanotube-purifying material dispersed in carbonaceous material. This makes possible an efficient carbon nanotube purification by supporting the effective utilization of the iron particles.

In a preferred aspect of the carbon nanotube-purifying material disclosed herein, the iron particles are dispersed in the carbonaceous material as amorphous carbon-enveloped composite particles.

The enveloping of the iron particles in amorphous carbon in the carbon nanotube-purifying material of this aspect functions to protect the iron particles from alteration (oxidation and so forth). This therefore enables an efficient purification of the carbon nanotube by virtue of an effective utilization of the iron particles.

Another carbon nanotube-purifying material disclosed herein is used for the purification of carbon nanotube and is obtained by striking an arc discharge between a pair of electrodes wherein at least the positive electrode is an iron-containing carbon molding and causing the deposition of evaporated material produced from said positive electrode.

This carbon nanotube-purifying material is well adapted for obtaining purified carbon nanotube by the treatment of carbon nanotube-containing carbonaceous material obtained by any method. This purification material is typically used by adding it to the aforementioned carbon nanotube-containing carbonaceous material in combination with a suitable oxidizing agent (hydrogen peroxide is particularly preferred). For example, this purification material can preferably be employed as the iron material used in either the carbon nanotube production method or carbon nanotube purification method described in the preceding. This carbon nanotube-purifying material typically has a composition in which iron particles with an average particle size of 5 nm to 100 nm (for example, 5 nm to 30 nm) are dispersed as amorphous carbon-enveloped composite particles. This enables an efficient carbon nanotube purification based on an effective utilization of the iron particles.

BEST MODE FOR CARRYING OUT THE INVENTION

Figure 1:
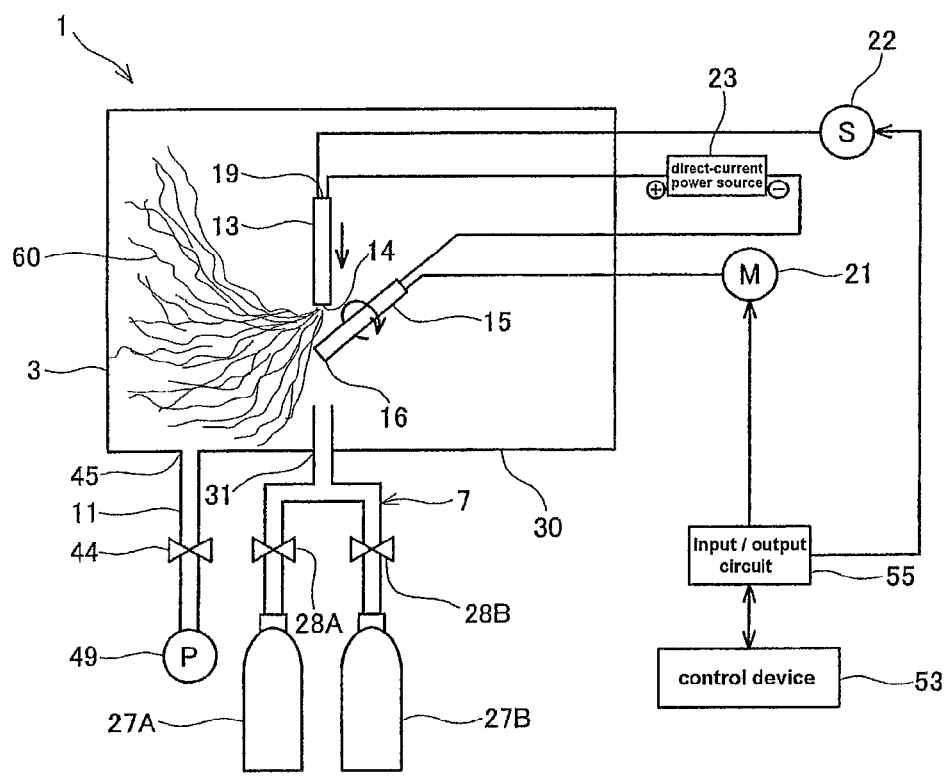
FIG. 1 is a schematic diagram that shows the structure of an apparatus used to produce single-walled carbon nanotube in accordance with an embodiment.

Preferred embodiments of the present invention are described in the following. Elements that are required to carry out the present invention (for example, the method of carbon nanotube synthesis, the method of carbon nanotube recovery, and so forth) in addition to those elements particularly discussed in this Description (for example, the composition of the carbonaceous material used, the iron material used, the inorganic acid component used, and so forth; the method of adding the iron material and hydrogen peroxide; the quantity of iron material addition; the quantity of hydrogen peroxide addition; and so forth) can be understood as a workshop element or design element for the person skilled in the art based on existing technology in the pertinent field. The present invention can be carried out based on the contents disclosed in this Description and the common general technical knowledge in the pertinent field.

The production method of the present invention can use various materials and compositions insofar as it is possible therewith to acquire high-purity carbon nanotube from carbon nanotube-containing carbonaceous material that is unpurified (or that requires additional purification) by the addition to said carbonaceous material of the iron material and hydrogen peroxide.

The prepared carbonaceous material in the present invention may be any carbon nanotube-containing carbonaceous material and is not particularly limited. Thus, this carbonaceous material can encompass the various unpurified products (recovered material) synthesized by any of the heretofore known carbon nanotube synthesis methods, for example, the arc discharge procedure, laser ablation technique, and chemical vapor deposition process (i.e., CVD process). Moreover, this prepared carbonaceous material may also be a commercially acquired carbon nanotube (including impurities). The product obtained by the arc discharge procedure is particularly preferred because it contains low-defect, high-quality carbon nanotube. A suitable example of the prepared carbonaceous material under consideration here is the single-walled carbon nanotube-containing carbonaceous material obtained with the incorporation of catalyst metal in at least the positive electrode.

In specific terms, the carbon nanotube-containing carbonaceous material can be obtained, for example, by an arc discharge procedure carried out as described in the following. That is, voltage is applied and current is fed between a carbon molding negative electrode (typically rod shaped) and a carbon molding positive electrode (typically rod shaped) that contains a catalyst metal. The arc heat accompanying the arc discharge thereby produced causes the evaporation of carbon and so forth from the carbon molding positive electrode. The evaporated carbon forms a single-walled carbon nanotube-containing product in the interelectrode gap under the action of the arc heat and catalyst. The carbon nanotube obtained in this manner is of high quality and is obtained in high yield.

The catalyst metal present in the carbon molding positive electrode preferably is at least one metal selected from the group consisting of nickel (Ni), cobalt (Co), and the platinum group elements (Ru, Rh, Pd, Os, Ir, Pt) or is an alloy made up mainly of such a metal. Particularly preferred thereamong is the use of a catalyst metal comprising nickel (Ni) or an alloy made up mainly of nickel (Ni). This catalyst metal can be specifically exemplified by nickel catalysts, nickel/yttrium (Ni/Y) catalysts, and nickel/cobalt (Ni/Co) catalysts. Palladium/rhodium (Pd/Rh) catalysts are another specific example of catalyst metals that are preferably used.

The carbon nanotube-containing carbonaceous material (that is, the purification target) prepared in this manner is preferably washed prior to the addition thereto of the iron material and hydrogen peroxide. This washing treatment can remove impurity (for example, catalyst metal and amorphous carbon, which can be readily washed out of this carbonaceous material) that is admixed within the material. This washing treatment can be carried out, for example, using a suitable washing solution, for example, alcohol (e.g., ethanol), clean water, and so forth. There is no limitation on the number of times washing may be carried out, and washing may be carried out only a single time or may be carried out repeatedly. Ultrasonic vibrations may be applied during this washing treatment. This can improve the effect of the washing treatment.

The carbonaceous material (purification target) is then recovered and a treatment is carried out by the addition thereto of the iron material and hydrogen peroxide. This treatment is preferably carried out with the carbonaceous material that is the treatment target in a highly dispersed state in a suitable solvent. Stirring with a stirring rod, dispersion with a blender, dispersion with ultrasound, and so forth can be used as the means for dispersing the carbonaceous material in the solvent, but this means is not limited to the preceding. For example, dispersion with ultrasound can preferably be used from the standpoint of enabling an efficient dispersion of the carbonaceous material. Water (for example, clean water) can preferably be used for the solvent for dispersing the carbonaceous material because water has little influence on the oxidation treatment. Or, aqueous hydrogen peroxide may be directly used as the solvent and the carbonaceous material may be dispersed therein.

The iron material used in the present invention may contain iron (Fe) in any state. For example, the iron material may contain iron as such (metallic iron) or may contain iron as an alloy made up mainly of iron. Or, an iron atom-containing compound (an iron compound) may be used as the iron material. These iron compounds can be exemplified by iron atom-containing oxides (e.g., ferric oxide, ferrous oxide), iron atom-containing inorganic salts (e.g., iron nitrate, iron chloride, iron sulfate), and so forth. Iron chloride is an example of an iron compound preferred thereamong. Thus, the iron added to the carbonaceous material in the execution of the present invention may be in particulate form or may be dissolved in a solvent (it can be an ion in various states).

As long as this iron material can function as a source of iron (Fe) supply, it may contain an element other than iron (for example, carbon). A representative example of such an iron material that also contains a non-iron element is an iron material that includes both an iron component and a carbon nanotube-containing carbonaceous material. This iron component may have any form, i.e., metallic iron, iron alloys, and iron compounds. The iron material preferably has this iron component (for example, metallic iron) dispersed in particulate form in the aforesaid carbonaceous material.

Iron powder (metallic iron in particulate form) is an example of an iron material preferred for use in the method disclosed herein. The oxidation performance can be effectively raised by the use of this iron powder. This therefore enables an efficient oxidative removal of the impurities present in the carbon nanotube-containing carbonaceous material (purification target). In addition, iron powder is generally preferred because it is relatively inexpensive and hence is economical.

Among iron powders, the use is preferred of iron powder composed of iron particles having an average particle size no greater than 500 nm (more preferably no greater than 300 nm). The use of such an iron powder enables a particularly good manifestation of the effect of increasing the efficiency of oxidative removal of the impurities present in the carbonaceous material (purification target). There is no particular limitation on the lower limit for the average particle size of the iron particles composing the iron powder. Taking in consideration one or more of the factors of ease of acquisition, cost, handling characteristics, dispersibility (for example, the dispersibility in the solvent when treatment is carried out with the iron powder dispersed in solvent in combination with the carbonaceous material), the use is generally preferred of iron powder having an average particle size of at least 50 nm.

Another preferred example of the iron material for use in the method disclosed herein is an iron-containing carbonaceous material comprising iron particles with an average particle size no greater than 100 nm (typically 3 nm to 100 nm, preferably 3 nm to 50 nm, and more preferably 5 nm to 20 nm, for example, 5 nm to 10 nm) dispersed in a carbon nanotube-containing carbonaceous material. In a preferred aspect of this iron-containing carbonaceous material, the iron particles are dispersed approximately uniformly in the aforementioned carbonaceous material. Put differently, the iron particles are present thoroughly scattered throughout the carbonaceous material as a whole. The microfine iron particles under consideration, when used in combination with an oxidizing agent such as hydrogen peroxide, have an excellent capacity to efficiently oxidatively remove the impurities present in the carbon nanotube-containing carbonaceous material (purification target); however, these iron particles are prone to aggregate when simply present by themselves. The aggregated iron particles are unable to thoroughly manifest their native effect. The use of an iron-containing carbonaceous material in which iron particles of the aforementioned size are dispersed in carbonaceous material enables an effective utilization of these microfine iron particles and thereby makes possible an efficient carbon nanotube purification.

This iron-containing carbonaceous material can be understood to be a carbon nanotube-purifying material for purifying another carbonaceous material that contains carbon nanotube (typically carbonaceous material that does not contain iron) to obtain purified carbon nanotube.

In a preferred aspect of the aforementioned carbon nanotube-purifying material (or iron-containing carbonaceous material serving as the iron material), the iron particles are dispersed in the form of amorphous carbon-enveloped composite particles. This functions to facilitate handling because the iron particles are thereby protected from alteration (oxidation and so forth). For example, even without taking special measures, for example, conducting the use and storage of this purification material under an inert gas atmosphere (for example, nitrogen gas) at all times (for example, even if handled in an air), the iron particles present in such a purification material can be easily maintained in a metallic iron state (unoxidized state).

When an oxidizing agent, e.g., hydrogen peroxide, and a carbon nanotube-purifying material (iron material) containing such amorphous carbon-coated microfine iron particles are added to the purification target (carbon nanotube-containing carbonaceous material), the amorphous carbon coating the iron particles is oxidatively removed, thereby exposing the iron particles (typically metallic iron particles). The effective utilization of these iron particles enables an efficient carbon nanotube purification. Viewed from this perspective, the amorphous carbon coating the iron particles is preferably relatively thin. For example, a very suitable carbon nanotube-purifying material (iron material) is carbon nanotube-purifying material that contains iron particles coated by an amorphous carbon layer having an average thickness of about 2 nm to 5 nm.

In addition, the product obtained by an arc discharge procedure using a positive electrode containing iron as the catalyst metal in the heretofore known method of carbon nanotube production can be preferably used as the iron material that is used in the method disclosed herein. The iron component volatilized from the positive electrode is present in the product (iron-containing carbonaceous material) obtained by an arc discharge procedure that uses such an iron-containing positive electrode. This iron component can be preferably used as a source of iron supply in the method disclosed herein. Accordingly, the iron-containing carbonaceous material obtained by the aforementioned arc discharge procedure can be understood to be a carbon nanotube-purifying material for purifying another carbonaceous material that contains carbon nanotube (typically carbonaceous material that does not contain iron) to obtain purified carbon nanotube.

The aforementioned iron component occurs in particulate form in a typical aspect of the iron-containing carbonaceous material under consideration. The aforementioned iron component is preferably present in the form of particles of metallic iron. These particles are preferably thoroughly dispersed. The average particle size of these particles can be, for example, no more than 100 nm (typically 3 nm to 100 nm, preferably 3 nm to 50 nm, and more preferably 5 nm to 20 nm, for example, 5 nm to 10 nm). The use of an iron-containing carbonaceous material that contains iron particles with such a size in particular enables a better manifestation of the effect of increasing the efficiency of oxidative removal of the impurities present in the aforementioned carbonaceous material (purification target).

The positive electrode used in this arc discharge procedure can be obtained by molding a mixture containing an iron component powder (iron source powder) and carbon powder into a prescribed shape (typically rod shaped). There are no particular limitations on the molding method therefor, and, for example, a general powder compression molding method can be used. Iron powder can preferably be used as the iron source powder, but the iron source powder is not limited to this. It is preferably at least an iron source powder that can form iron particles in the product (carbon-containing carbonaceous material) obtained by arc discharge. The mixing proportion between the iron source powder and the carbon powder can be a proportion that provides an iron/carbon (Fe/C) atomic ratio of, for example, 0.1 to 10 at % (more preferably 0.2 to 5 at %). The product obtained by an arc discharge procedure using such a positive electrode contains iron and carbon (including both the carbon making up the carbon nanotube and the impurity carbon) generally in about the same ratio as the iron/carbon (Fe/C) atomic ratio in the positive electrode.

The product obtained by striking an arc discharge between a pair of electrodes wherein at least the positive electrode is an iron-containing carbon molding and depositing evaporated material produced from the positive electrode, can be directly used (added to the carbonaceous material that is the purification target) as the carbon nanotube-purifying material or iron-containing carbonaceous material (iron material) disclosed herein. In addition, just as for the carbonaceous material that is the purification target, this product may be used after having been washed. Or, this product can also be used after the execution of an oxidation treatment thereon as desired. For example, a portion of the amorphous carbon coating the iron particles may be removed by such an oxidation treatment in order to reduce the thickness of the amorphous carbon coating the iron particles. This makes it easier for removal of the amorphous carbon coating the iron particles to occur when this carbon nanotube-purifying material (iron material) is used. The result of this is to enable a more efficient carbon nanotube purification. Or, the amorphous carbon may be removed by this oxidation treatment to such an extent that at least the major portion of the iron particle is exposed. Such a carbon nanotube-purifying material (iron material) can provide a more efficient carbon nanotube purification. However, this carbon nanotube-purifying material (iron material) is preferably handled in a nonoxidizing atmosphere (preferably an inert gas atmosphere) in order to prevent, e.g., oxidation, of the exposed (not coated by amorphous carbon) iron particles.

The quantity of addition of the iron material under consideration is not particularly limited. For example, the iron material may be added at a rate of about 0.5 to 20 mass parts as iron (Fe) (preferably approximately 1 to 15 mass parts and more preferably approximately 7 to 13 mass parts) per 100 mass parts of the carbonaceous material. These addition rates can preferably be used when, for example, iron powder is used as the iron material. When an iron-containing carbonaceous material is used as the iron material, addition may be carried out at a rate that provides a mass for this iron material as a whole (that is, including the carbonaceous material) of approximately 2 to 50 mass parts (preferably 5 to 20 mass parts) per 100 mass parts of the carbonaceous material.

The hydrogen peroxide used in the present invention is not particularly limited and may be any hydrogen peroxide obtained by the various heretofore known methods of production. For example, the hydrogen peroxide used can be obtained by the electrolytic oxidation of an aqueous solution of ammonium bisulfate ($NH_4HSO_4$) obtained from sulfuric acid ($H_2SO_4$) and ammonia ($NH_3$). In addition, a commercially available aqueous hydrogen peroxide solution (ordinarily the 30% aqueous solution) may be directly used (for example, in the concentration as obtained).

In those instances where a commercially available aqueous hydrogen peroxide solution is used and the purification treatment is carried out by immersing the carbonaceous material and iron material in a solution (for example, an aqueous solution) that contains this aqueous hydrogen peroxide solution, there is no particular limitation on the content of the aqueous hydrogen peroxide solution in said solution and the treatment can be carried out using various contents. For example, the content of the aqueous hydrogen peroxide solution may be 5 to 50 mass % (preferably 10 to 30 mass % and more preferably 15 to 25 mass %) of the carbonaceous material-containing solution (treatment solution) as a whole. Addition of the aqueous hydrogen peroxide solution to the carbonaceous material so as to provide such a content is preferred. When purification is carried out by heating at reflux as described below, a suitable supplemental addition of the aqueous hydrogen peroxide solution may be made since the total amount of the solution (amount of the treatment solution) tends to decline during such a heating under reflux.

There are no particular limitations on the mode of adding the iron material and hydrogen peroxide to the carbonaceous material as long as the former and the carbonaceous material are brought into the presence of the other (the iron material and hydrogen peroxide are typically brought into the carbonaceous material). The iron material and hydrogen peroxide are preferably added sequentially or simultaneously to a solution in which the carbonaceous material has been dispersed. When iron powder is used as the iron material, the iron powder preferably is added simultaneously with the hydrogen peroxide or subsequent to the hydrogen peroxide.

When an iron-containing carbonaceous material as described above is used as the iron material, the hydrogen peroxide is preferably added to a dispersion prepared in advance by dispersing the iron-containing carbonaceous material in a solvent along with the carbonaceous material (the same dispersing techniques as used for the carbonaceous material can be used as appropriate to disperse the iron-containing carbonaceous material). This preliminary dispersion of the iron-containing carbonaceous material serving as the iron material in a solvent in combination with the carbonaceous material serving as the purification target (typically a carbonaceous material that does not contain iron) makes it possible to efficiently purify the carbon nanotube present in these two carbonaceous materials.

The purification treatment described hereinabove is carried out in a preferred aspect by heating under reflux. The heating conditions are not particularly limited, but heating is preferably carried out to the point where the treatment mass (treatment solution) can boil at atmospheric pressure (i.e., heating until the boiling point of the treatment solution is reached). This reflux is preferably conducted while carrying out a successive supplemental addition of the hydrogen peroxide. While a supplemental addition of the iron material is not required, it may also be successively supplementally added just as for the hydrogen peroxide. An even higher carbon nanotube purification efficiency can be obtained by carrying out the purification treatment under these conditions of thermal reflux.

As desired, treatment of the carbonaceous material can be carried out with the addition of an inorganic acid. Hydrochloric acid, nitric acid, sulfuric acid, sulfurous acid, nitrous acid, and so forth, can be used as the inorganic acid without particular limitation. Hydrochloric acid is an example of a preferred inorganic acid among the preceding. There is no particular limitation on the concentration of the inorganic acid. The inorganic acid can be added after the iron material and hydrogen peroxide have been added. In this case, the inorganic acid may be added after heating under reflux has been carried out for a prescribed period of time prior to the addition of the inorganic acid and heating under reflux may then be continued after the addition of the inorganic acid. Or, the inorganic acid may be added at the same time as the addition of the iron material and hydrogen peroxide. That is, treatment of the carbonaceous material by heating under reflux can be started in the presence of iron, hydrogen peroxide, and inorganic acid.

The purified carbon nanotube is recovered or collected after completion of the aforementioned treatment by heating under reflux. There are no particular limitations on the recovery procedure. For example, the sedimented material may be recovered by fractional filtration after the material that has undergone treatment by heating under reflux has been allowed to stand at quiescence, or recovery may be carried out by centrifugal filtration, or by suction filtration of the material that has undergone treatment by heating under reflux, or recovery may be carried out using a combination of these procedures. The recovered material is preferably washed with a washing solution. This washing treatment can separate (wash out) oxidized or dissolved impurities from the recovered carbon nanotube. Low-impurity water or alcohol (for example, ethanol) can preferably be used as the washing solution. Ultrasonic vibrations may be applied during this washing in order to improve the washing performance. This washing step may be carried out a single time or may be repeated a plurality of times.

After washing, the carbon nanotube can be recovered by, for example, a procedure such as suction filtration. The yield of purified carbon nanotube will vary with the particular procedure used to produce the carbonaceous material itself, but, designating the mass of the carbonaceous material before purification as 100%, the yield can be such that the purified carbon nanotube is obtained in an amount that corresponds to about 5 to 80%, preferably about 10 to 50%, and particularly about 10 to 30% of the mass of the carbonaceous material before purification.

Several examples according to the present invention are described below, but this should not be taken to imply that the present invention is limited by what is shown in these examples.

Example 1

Specific examples of the production of purified carbon nanotube will be described. An example of an apparatus used to produce single-walled carbon nanotube will first be described with reference to the drawings.

(1) The Production Apparatus

An example of the structure of an apparatus 1 for producing single-walled carbon nanotube is shown in FIG. 1. In general terms, this apparatus 1 is composed of a reaction vessel 3, a pair of electrodes 13, 15 disposed within the reaction vessel 3, and a gas feed means 7 that feeds gas to the reaction vessel 3.

The reaction vessel 3 is a sealable pressure-resistant vessel and is composed of, for example, stainless steel.

A positive electrode 13 and a negative electrode 15 are disposed within this reaction vessel 3. These electrodes 13, 15 are each rod shaped. The positive electrode 13 is disposed in the reaction vessel 3 with its central axis (long axis) extending approximately along the vertical. The negative electrode 15, on the other hand, is inclined at an angle (for example, about 20° to 50° and particularly 30°) with respect to the central axis of the positive electrode 13, and one end 16 of the former is disposed in a position facing one end 14 of the positive electrode 13. Thus, the disposition is such that an extension of the central axis of the positive electrode 13 intersects an extension of the central axis of the negative electrode 15 at a prescribed angle. Moreover, neither of the electrodes 13, 15 is limited in its shape to a stick shape, and a region may be present where these electrodes face each other (for example, opposing faces). One or both of these electrodes may therefore have, for example, a tablet shape. The size of the gap between the positive electrode 13 and the negative electrode 15 is not particularly limited. For example, about 0.1 mm to 10 mm and particularly about 0.5 mm to 5 mm, which provides a high single-walled carbon nanotube production efficiency in the arc discharge procedure, is suitable. The positive electrode 13 and the negative electrode 15 are disposed at an acute angle therebetween in the example in FIG. 1; however, there is no limitation to the disposition shown in FIG. 1 as long as one end of the positive electrode 13 is facing one end of the negative electrode 15. For example, the positive electrode 13 and the negative electrode 15 may be disposed facing each other along the horizontal or along the vertical.

A direct-current power source 23 capable of applying a voltage that can produce an arc discharge between the positive electrode 13 and the negative electrode 15 is connected to the positive electrode 13 and the negative electrode 15. While an example is shown here in which a direct-current power source is used, an alternating-current power source may also be used.

The positive electrode 13 is composed of a heat-resistant electroconductive material, for example, with a diameter of about 6 mm and a length of about 75 mm, that is capable of evaporating off carbon under the action of an arc discharge. Various carbon materials can be used as such a material. For example, a carbon material comprising a catalyst of single-walled carbon nanotube synthesis incorporated in graphite can preferably be used. This catalyst, can be, for example, nickel or a nickel alloy (preferably nickel/yttrium), or cobalt, and so forth. Such a positive electrode 13 can be obtained, for example, by blending a catalyst powder (for example, a nickel/yttrium powder) into graphite powder and subjecting the blend to powder compression molding.

A solenoid 22 is connected to the end (base) 19 on the opposite side from the surface (end region) 14 on the positive electrode 13 that faces the negative electrode 15. This solenoid 22 enables the vertical displacement (i.e., in the direction of the opposing surface (end region) 16 of the negative electrode 15, or downward in the particular case of FIG. 1) of the positive electrode 13 (electrode holder), which has been installed in an electrode holder (not shown). The gap between the two electrodes 13, 15 can be held constant by using this solenoid 22 to displace the positive electrode 13 in conformity to the attrition of the positive electrode 13 caused by carbon evaporation.

The negative electrode 15, for example, has a diameter of about 10 mm and a length of about 100 mm and is composed of a heat-resistant electroconductive material. A suitable selection from, for example, various carbon materials, metals (for example, copper), and so forth, can be used as this heat-resistant electroconductive material. When an alternating-current power source is used as the power source, just as for the positive electrode 13 the use is preferred of a negative electrode 15 comprising a catalyst of the synthesis of single-walled carbon nanotube incorporated in carbon (for example, graphite).

A motor 21 is connected to this negative electrode 15. This motor 21 is disposed to enable the rotation of the negative electrode 15, which is held in an electrode holder (not shown), about its long axis.

The gas feed means 7, which feeds a gas atmosphere into the reaction vessel 3, has cylinders 27A, 27B for supplying the gas atmosphere. These cylinders 27A, 27B are connected to a gas feed port 31 that is disposed in a region (the bottom 30 in this case) of the reaction vessel 3 and are disposed so as to make possible the introduction of a gas atmosphere into the reaction vessel 3 from the gas feed port 31. The valves 28A, 28B are disposed, respectively, in the conduits that run from the cylinders 27A, 27B to the gas feed port 31. The operation of these valves 28A, 28B makes it possible to control the supply timing and the amount of the gas atmosphere fed to the reaction vessel 3 from the cylinder 27A and/or the cylinder 27B.

Helium is used as the gas atmosphere in the carbon nanotube acquisition step described below, but the type of gas atmosphere is not limited to this. For example, an inert gas other than helium may be used as the gas atmosphere. This inert gas can be exemplified by nitrogen, neon, argon, krypton, xenon, and so forth. Only a single species of inert gas may be used from thereamong, or two or more species of inert gas may be used at any mixture composition. Or, a mixed gas of hydrogen with one or two more of the aforementioned inert gases may be used as the gas atmosphere. A mixed gas of a plurality of gas species may thus be used as the gas atmosphere.

The cylinders 27A, 27B shown in FIG. 1 can supply the same species of gas atmosphere (for example, helium). In this configuration, for example, the cylinder 27B can be exchanged with the valve 28B being closed (typically to exchange an empty cylinder for a fresh one) while the gas atmosphere is fed into the reaction vessel 3 from the cylinder 27A with the valve 28A being open. In addition, different gases can be supplied from the cylinder 27A and the cylinder 27B. In this case, for example, the mixing ratio between the gas fed from the cylinder 27A (for example, argon) and the gas fed from the cylinder 27B (for example, hydrogen) can be controlled by adjusting the apertures of the valves 28A, 28B.

A discharge section 11, through which the gas in the reaction vessel 3 can flow, is connected to a region (the bottom 30 in this case) of the reaction vessel 3. The gas within the reaction vessel 3 can be discharged from the vessel through an exhaust port 45 by the suctioning of the gas within the reaction vessel 3 by a vacuum pump 49 that is disposed in the discharge section 11. In addition, the pressure of the gas atmosphere in the reaction vessel 3 can be controlled by balancing the amount of gas atmosphere supplied from the gas feed means 7 with the amount of gas discharged through the discharge section 11.

The direct-current power source 23, the motor 21, and the solenoid 22 are connected to an input/output circuit 55, which receives control instructions from a control device 53 that operates based on a predetermined program or based on manual operation. This configuration makes it possible to control, based on the applied voltage, the displacement of the positive electrode 13 and the rotation of the negative electrode 15. Thus, the status of the arc discharge can be computed by the control device 53 from the voltage applied between the positive electrode 13 and the negative electrode 15, and, in correspondence to the growth of the single-walled carbon nanotube-containing product generated by the arc discharge, a control signal that regulates displacement of the positive electrode 13 and rotation of the negative electrode 15 can be output from the input/output circuit 55 to the motor 21 and the solenoid 22. This aspect makes it possible to induce arc discharge under stable conditions and to obtain a single-walled carbon nanotube-containing product (i.e., the carbonaceous material in this example) of even quality (and as desired in a uniform and broadly dispersed thin layer).

(2) Acquisition of the Carbon Nanotube-Containing Carbonaceous Material

Single-walled carbon nanotube was synthesized using the production apparatus 1 with the structure described in the preceding. First, a positive electrode 13 and a negative electrode 15 as described above were prepared, and these electrodes 13, 15 were installed in their respective electrode holders (not shown) within the reaction vessel 3 so as to realize a pre-determined prescribed gap therebetween. The valve 44 of the discharge section 11 provided on the reaction vessel 3 was opened and the gas within the reaction vessel 3 was exhausted by the operation of the vacuum pump 49 connected to the exhaust port 45. The pressure within the reaction vessel 3 was thereby reduced. The valve 44 was constricted once the interior of the vessel 3 was brought down to a high vacuum of about 13 to $1.3 \times 10^{-3}$ Pa, and a gas atmosphere was introduced from the gas feed means 7 into the reaction vessel 3. Helium was used as the gas atmosphere in the present case. Using the vacuum pump 49 and the gas feed means 7, the gas pressure (gas atmosphere pressure) within the reaction vessel 3 was adjusted so as to maintain the helium pressure in the reaction vessel 3 at about $6.6 \times 10^4$ Pa.

A voltage was applied between the positive electrode 13 and the negative electrode 15 and current (typically 30 A to 70 A, for example, 60 A) was fed from the direct-current power source 23. The arc heat due to the arc discharge generated as a result caused the evaporation of carbon from the positive electrode 13. The voltage applied here can be suitably selected in conformity with the desired carbon evaporation rate. The voltage was set at about 30 V to 40 V in this instance. Displacement of the positive electrode 13 and rotation of the negative electrode 15 were carried out through calculation of the arc discharge status by the control device 53 from the applied voltage and the output, from the input/output circuit 55 to the motor 21 and the solenoid 22, of a control signal in response to carbon evaporation (that is, electrode attrition) due the arc discharge.

A single-walled carbon nanotube-containing product 60 was formed by this arc discharge procedure in the interelectrode gap by the action of the arc heat and the action of the catalyst. This product 60 spread into the reaction vessel 3 due to the flow of the gas atmosphere that was supplied (refer to FIG. 1). The carbon nanotube synthesis time (time during which voltage is applied) is not particularly limited here, and, for example, can be about 5 minutes to 20 minutes, preferably about 10 minutes to 15 minutes, and particularly about 11 minutes to 13 minutes. The synthesis time in this instance was 13 minutes.

After the operation of this apparatus had resulted in the deposition of a prescribed amount of single-walled carbon nanotube, the obtained single-walled carbon nanotube-containing product (that is, the carbonaceous material of this example) 60 was removed from the reaction vessel 3. A door (not shown) disposed in an openable/closable manner on the front face of the reaction vessel 3 was opened and the carbonaceous material 60 was separated from the interior of the vessel 3 with, for example, tweezers, and was removed. The carbonaceous material 60 produced by this apparatus is widely and uniformly dispersed over the entire surface of the reaction vessel 3 and as a result can be easily removed from the reaction vessel 3 also by the mode of picking out with, for example, tweezers, as described. In addition, because the positive electrode 13 was disposed on the vertical and the negative electrode 15 was disposed at an acute angle with respect to the positive electrode 13, the arc discharge occurred in a diagonal direction and it was possible to minimize the single-walled carbon nanotube-free deposition on the negative electrode. The carbon nanotube production rate was improved due to this. That is, a production rate of at least about 1 g/minute was realized in this example.

(3) Carbon Nanotube Purification

The product (carbonaceous material) obtained as described above contained catalyst (for example, nickel/yttrium powder) and impurity carbon along with the single-walled carbon nanotube. A treatment to reduce the content of catalyst and impurity carbon, i.e., a treatment to purify the carbon nanotube, was carried out on this product. The procedure of this purification treatment is described in the following.

200 mg of the obtained carbonaceous material and 50 mL ethanol were first placed in a 100 mL beaker and the mixture was treated with ultrasound (applied ultrasonic vibrations) for 30 minutes. This was then submitted to suction filtration to remove the fluid and recover the carbonaceous material.

200 mL distilled water was added to the recovered carbonaceous material and the resulting mixture was subjected to mixing by a blender for 4 minutes. More specifically, mixing was first carried out for 2 minutes, then resting for 1 minute, then mixing again for 2 minutes. The resulting carbonaceous material dispersion was divided into 100 mL portions to give a first purification target material and a second purification target material.

The first purification target material was treated by heating under reflux. Thus, the first purification target material was introduced into a flask equipped with a reflux condenser; 10 mg iron micropowder with an average particle size of about 0.2 μm and 20 mL commercially acquired 30% aqueous hydrogen peroxide were added; and heating was carried out. A supplemental addition of 40 mL of the aqueous hydrogen peroxide was made at 20 minutes after the liquid in the flask had boiled. A supplemental addition of 40 mL of the aqueous hydrogen peroxide was made after another 20 minutes, and a supplemental addition of 50 mL of the aqueous hydrogen peroxide was made after another 20 minutes. Heating was halted when 300 minutes had elapsed from that point, completing the reflux treatment. After cooling, the supernatant was eliminated to obtain a reflux-treated liquid.

The second purification target material was also subjected to the same reflux treatment to obtain a reflux-treated liquid.

Centrifugal separation was carried out for 30 minutes using a centrifugal separator (11,000 rpm) on the combined reflux-treated liquids obtained from the first and second purification target materials and the sedimented material was collected. 100 mL hydrochloric acid (concentration about 36%) was added to the collected sedimented material followed by treatment with ultrasound for 5 minutes and standing at quiescence for 12 hours. After the 12 hours had elapsed, the supernatant was gently discarded and the fraction containing single-walled carbon nanotube was recovered.

200 mL distilled water was added to this recovered fraction; treatment with ultrasound was carried out for 10 minutes; the supernatant was discarded after quiescence for about 2 hours; and another 200 mL distilled water was added and treatment with ultrasound was carried out for another 10 minutes. After similarly standing for about 2 hours, the supernatant was discarded and another 200 mL distilled water was added and treatment with ultrasound was carried out for another 10 minutes. After standing for about 2 hours, the supernatant was discarded and ethanol was then added followed by treatment with ultrasound for 10 minutes. Purified single-walled carbon nanotube was thereafter obtained by suction filtration. The mass of the obtained purified material was 28 mg by weighing with precision scales. The yield was 14%.

(4) Observation of the Properties of the Obtained Carbon Nanotube

Figure 2:
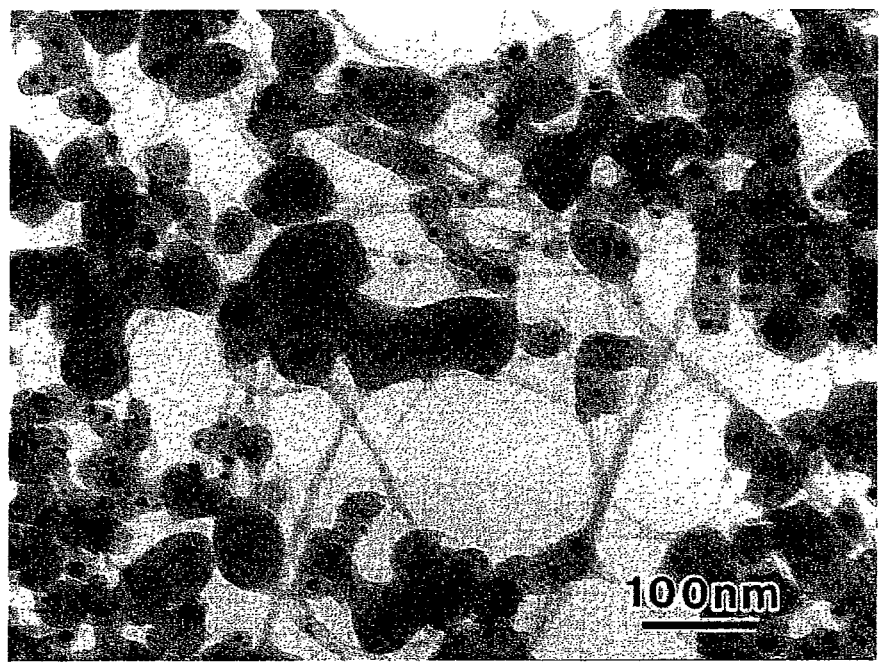
FIG. 2 is a TEM photograph of the pre-purification carbonaceous material used in Example 1.
Figure 3:
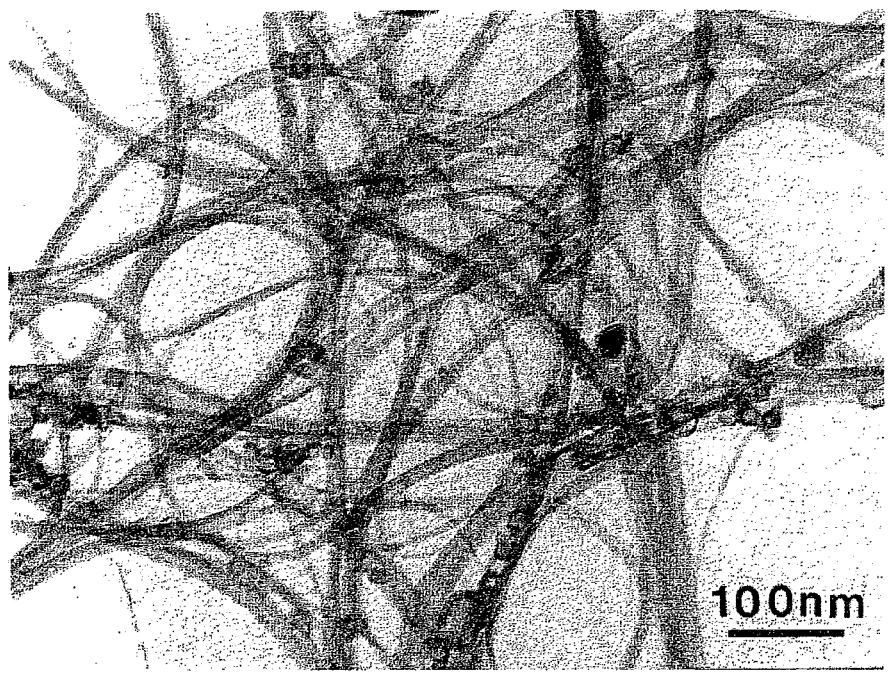
FIG. 3 is a TEM photograph of single-walled carbon nanotube after purification according to Example 1.
Figure 4:
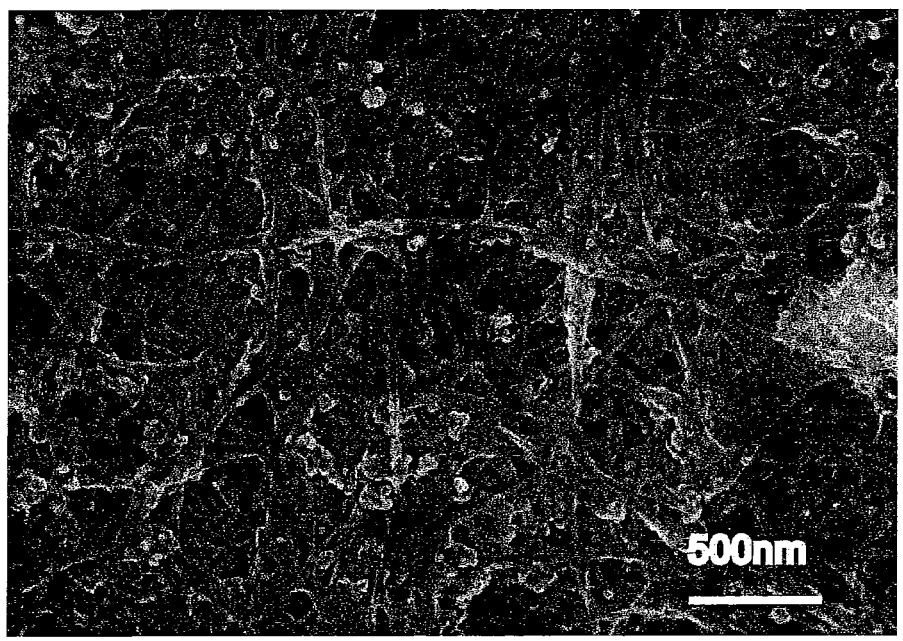
FIG. 4 is an SEM photograph of single-walled carbon nanotube after purification according to Example 1.

The single-walled carbon nanotube obtained by the purification step (3) described above was observed using a transmission electron microscope (TEM, Model H7000, Hitachi, Ltd.) and a scanning electron microscope (SEM, Model ABT-150F, TOPCON Corporation). For purposes of a comparative evaluation of the purification performance, the pre-purification carbonaceous material obtained in the above-described production step (2) was observed by TEM. These photographs are shown in FIGS. 2 to 4. FIG. 2 is a TEM photograph of the pre-purification carbonaceous material; FIG. 3 is a TEM photograph of the single-walled carbon nanotube post-purification; and FIG. 4 is an SEM photograph of the single-walled carbon nanotube post-purification.

As is shown in FIG. 2, nickel/yttrium nanoparticles (the catalyst metals) were admixed in large amounts on the surface of the carbon nanotube in the pre-purification carbonaceous material, demonstrating a low purity therefor. Carbon particles and graphite were also seen as impurities (carbon impurity). Moreover, the metal nanoparticles were thickly coated by the carbon impurity.

In contrast to this, in the case of the carbon nanotube purified in accordance with this example (FIGS. 3 and 4), metal catalyst particles and carbonaceous impurity are almost entirely unseen, and the surface of this carbon nanotube is clean and a high carbon nanotube purity is demonstrated. Moreover, modification of the structure of the post-purification carbon nanotube from that pre-purification is not seen, and it is demonstrated that this purification treatment did not damage the carbon nanotube.

Figure 5:
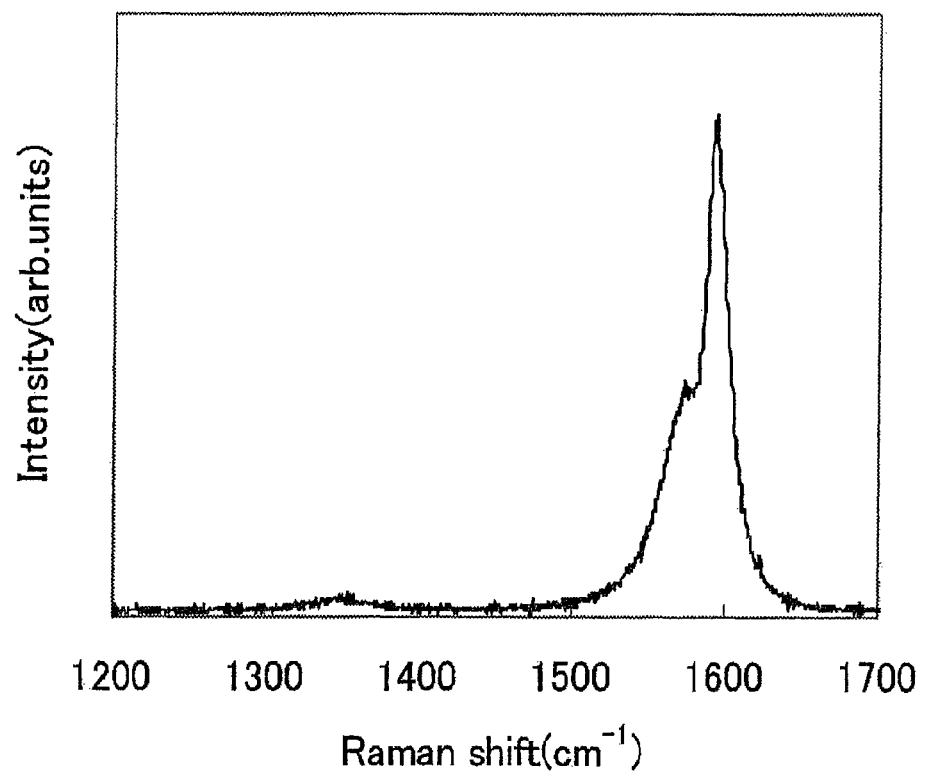
FIG. 5 is a Raman spectrum analytical chart of single-walled carbon nanotube after purification according to Example 1.

The Raman spectrum of the post-purification carbon nanotube obtained by this example was recorded. An instrument for measuring the Raman spectrum (RAMANOR T64000 from Jobin Yvon) was used to record the Raman spectrum. The result (chart) is shown in FIG. 5. A sharp peak was observed in the vicinity of 1593 $cm^{-1}$ in the Raman spectrum of this purified carbon nanotube. In addition, only a weak peak was observed in the vicinity of 1340 $cm^{-1}$. It is therefore shown that the obtained carbon nanotube has a high purity and also exhibits a high crystallinity.

Comparative Example

The carbon nanotube-containing carbonaceous material acquired in (2), supra, was purified as in Example 1, with the exception that the iron micropowder was not used in the purification step (3) described above. That is, the purification treatment was carried out in this comparative example with the addition of the aqueous hydrogen peroxide to the carbonaceous material (purification target), but without the addition of iron material thereto.

Example 2

This example used iron powder with an average particle size of about 2 μm in the purification step (3), supra, rather than the iron powder with an average particle size of about 0.2 μm. The carbon nanotube-containing carbonaceous material acquired in (2) above was purified in otherwise the same manner as in Example 1. That is, the purification treatment was carried out in this example by the addition to the aforementioned carbonaceous material (purification target) of the aqueous hydrogen peroxide and iron powder (iron material) with an average particle size of about 2 μm.

Example 3

Another example is described in the following of the purification of the carbon nanotube-containing carbonaceous material obtained in (2) above. This is a production example in which this carbonaceous material was purified using an iron material in the form of a carbonaceous material containing iron as an impurity (iron-containing carbonaceous material).

The carbonaceous material containing iron as an impurity was first prepared. This iron-containing carbonaceous material was produced using substantially the same procedure as in the production of the carbonaceous material described above in (2). The differences were that the positive electrode 13 contained an iron catalyst rather than the nickel/yttrium catalyst and that a 1:1 (volumetric ratio) mixed gas of argon and hydrogen at a total pressure of $2.6 \times 10^4$ Pa was used as the gas atmosphere rather than helium.

180 mg of the carbonaceous material obtained in accordance with (2) above, 20 mg of the iron-containing carbonaceous material cited above (iron material), and 50 mL ethanol were introduced into a 100 mL beaker and the mixture was treated for 30 minutes with ultrasound, after which these carbonaceous materials (referred to below as the "mixed carbonaceous material") were recovered by suction filtration.

200 mL distilled water was added to the recovered mixed carbonaceous material and the resulting mixture was subjected to mixing by a blender for 4 minutes. More specifically, mixing was first carried out for 2 minutes, then resting for 1 minute, then mixing again for 2 minutes. The resulting mixed carbonaceous material dispersion was divided into 100 mL portions to give a first purification target material and a second purification target material.

This first purification target material was introduced into a flask as described above and 20 mL of the commercially acquired aqueous hydrogen peroxide as described above was added. The same reflux treatment as described above in (3) was then carried out. That is, a supplemental addition of 40 mL of the aqueous hydrogen peroxide was made at 20 minutes after the liquid in the flask had boiled. A supplemental addition of 40 mL of the aqueous hydrogen peroxide was made after another 20 minutes, and a supplemental addition of 50 mL of the aqueous hydrogen peroxide was made after another 20 minutes. Heating was halted when 120 minutes had elapsed from that point, completing the reflux treatment. After cooling, the contents of the flask were treated by ultrasound for 10 minutes. After then standing for 2 hours, the supernatant was discharged to obtain the reflux-treated liquid.

The second purification target material was also subjected to the same reflux treatment to obtain a reflux-treated liquid.

Centrifugal separation was carried out for 30 minutes using a centrifugal separator (11,000 rpm) on the combined reflux-treated liquids obtained from the first and second purification target materials and the sedimented material was recovered. 100 mL hydrochloric acid (concentration about 36%) was added to this sedimented material followed by treatment with ultrasound for 5 minutes and standing at quiescence for 12 hours. After the 12 hours had elapsed, the supernatant was gently discarded and the fraction containing single-walled carbon nanotube was recovered.

200 mL distilled water was added to this recovered fraction; treatment with ultrasound was carried out for 10 minutes; the supernatant was discarded after quiescence for about 2 hours; and another 200 mL distilled water was added and treatment with ultrasound was carried out for another 10 minutes. After similarly standing for about 2 hours, the supernatant was discarded and another 200 mL distilled water was added and treatment with ultrasound was carried out for another 10 minutes. After standing for about 2 hours, the supernatant was discarded and ethanol was then added followed by treatment with ultrasound for 10 minutes. Purified single-walled carbon nanotube was thereafter obtained by suction filtration. The mass of the obtained purified material was 42 mg by weighing with precision scales. The yield was 21%.

Observation of the Properties of the Purified Single-Walled Carbon Nanotube

Figure 6:
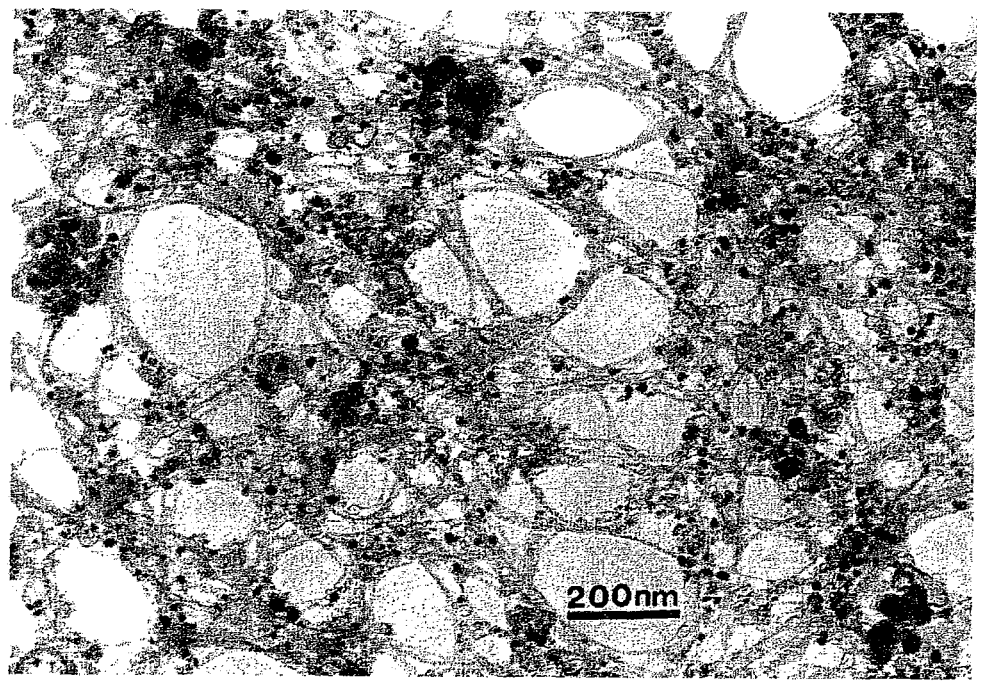
FIG. 6 is a TEM photograph of single-walled carbon nanotube after purification according the Comparative Example.
Figure 7:
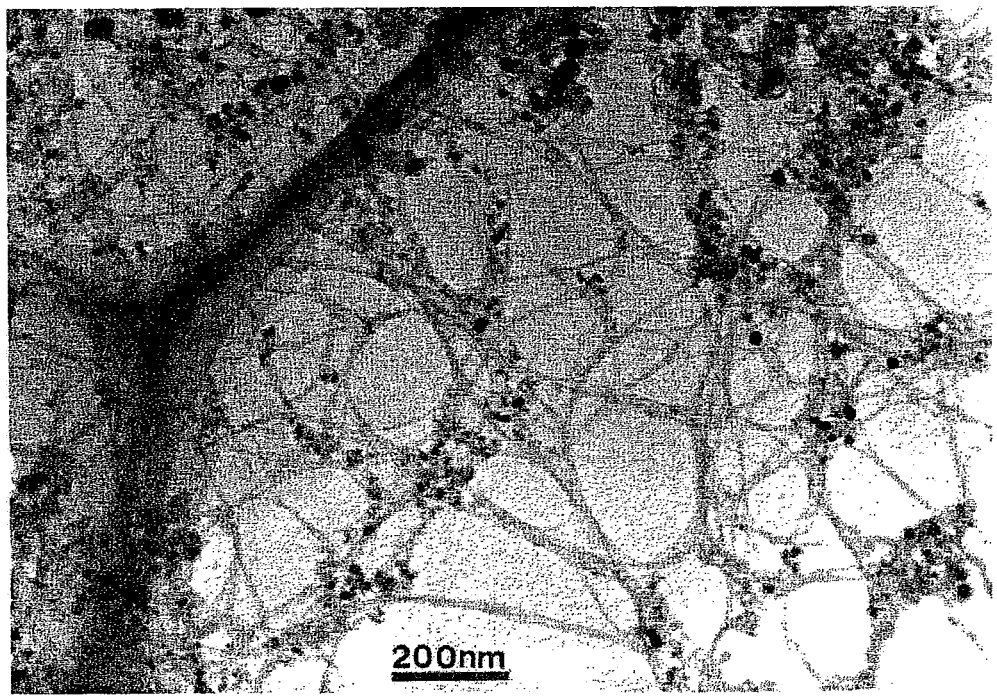
FIG. 7 is a TEM photograph of single-walled carbon nanotube after purification according to Example 2.
Figure 8:
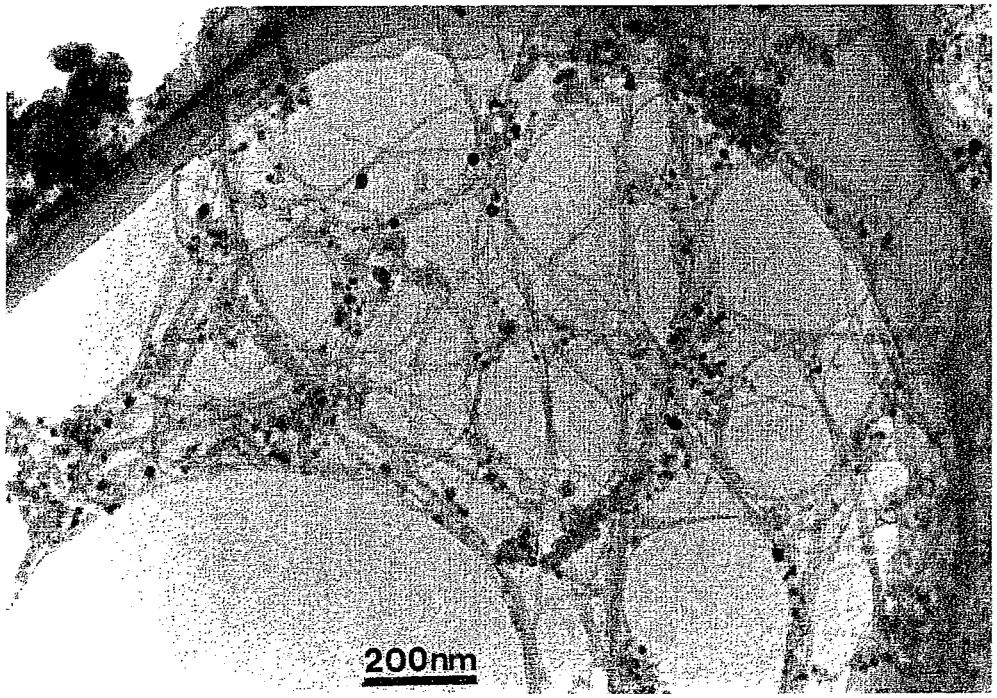
FIG. 8 is a TEM photograph of single-walled carbon nanotube after purification according to Example 1.

TEM photographs of the purified materials obtained by the preceding examples and the Comparative Example are shown in FIGS. 6 to 9. The assignment of these TEM photographs to the individual examples and the Comparative Example is given in Table 1 along with a summary of the purification conditions therein. In the table, the presence of a "yes" in the hydrogen peroxide column for an example or the Comparative Example indicates that purification was carried out with the addition of hydrogen peroxide in that particular example or the Comparative Example. The presence of a "- (hyphen)" in the iron material column for the Comparative Example indicates that purification was carried out without the addition of the iron material in the Comparative Example. In order to facilitate comparison with the Comparative Example and the other examples, FIG. 8 is a TEM photograph of the purified material obtained in Example 1 at a different magnification from that in FIG. 3.

TABLE 1

Figure 9:
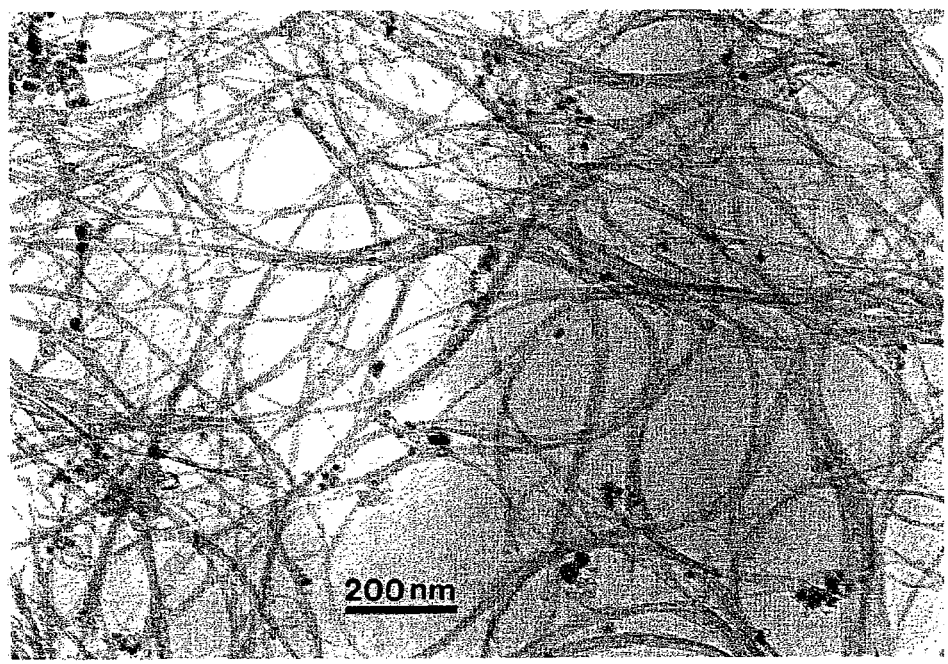
FIG. 9 is a TEM photograph of single-walled carbon nanotube after purification according to Example 3.
Figure 10:
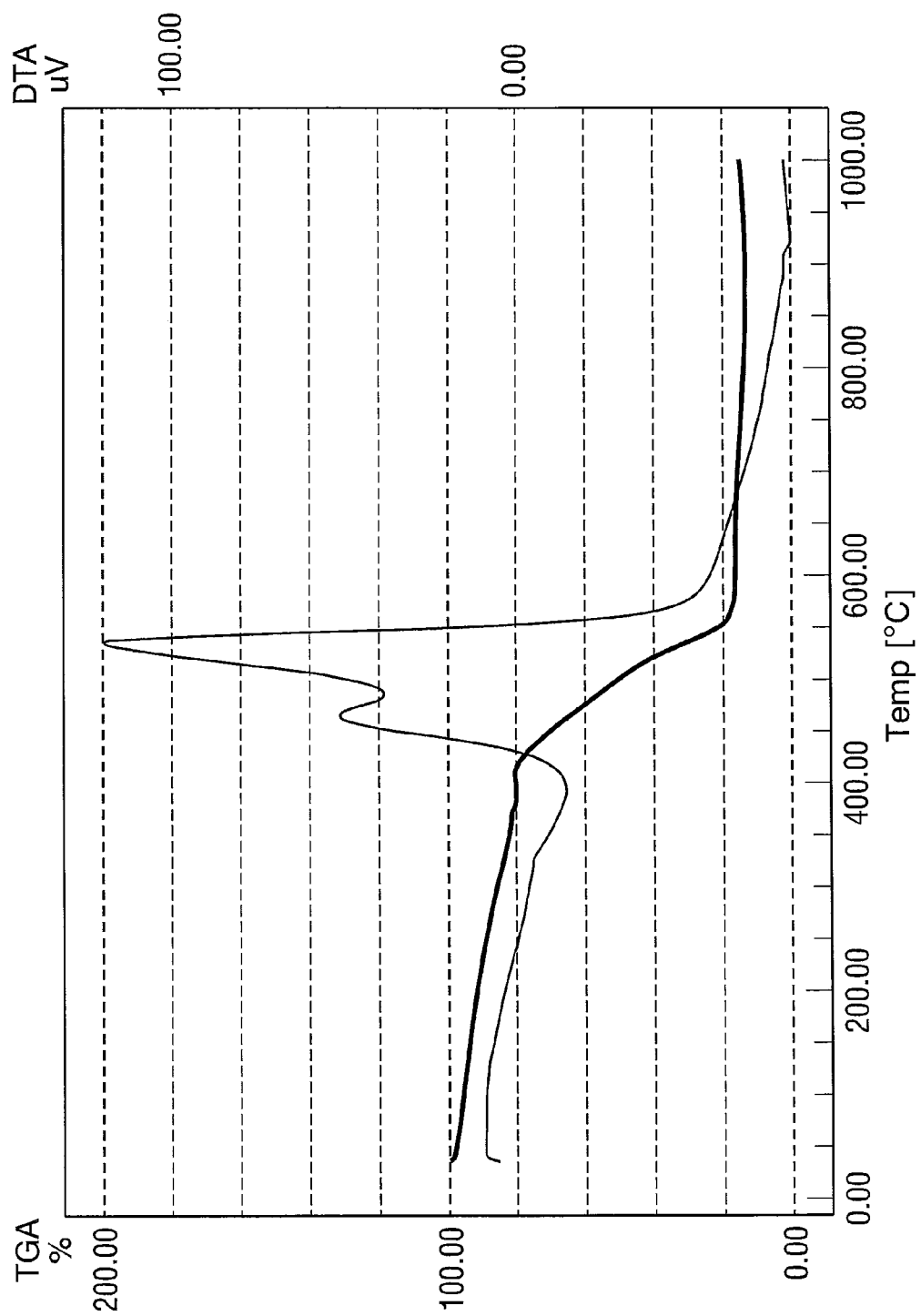
FIG. 10 is a TGA chart of single-walled carbon nanotube after purification according to the Comparative Example.
Figure 11:
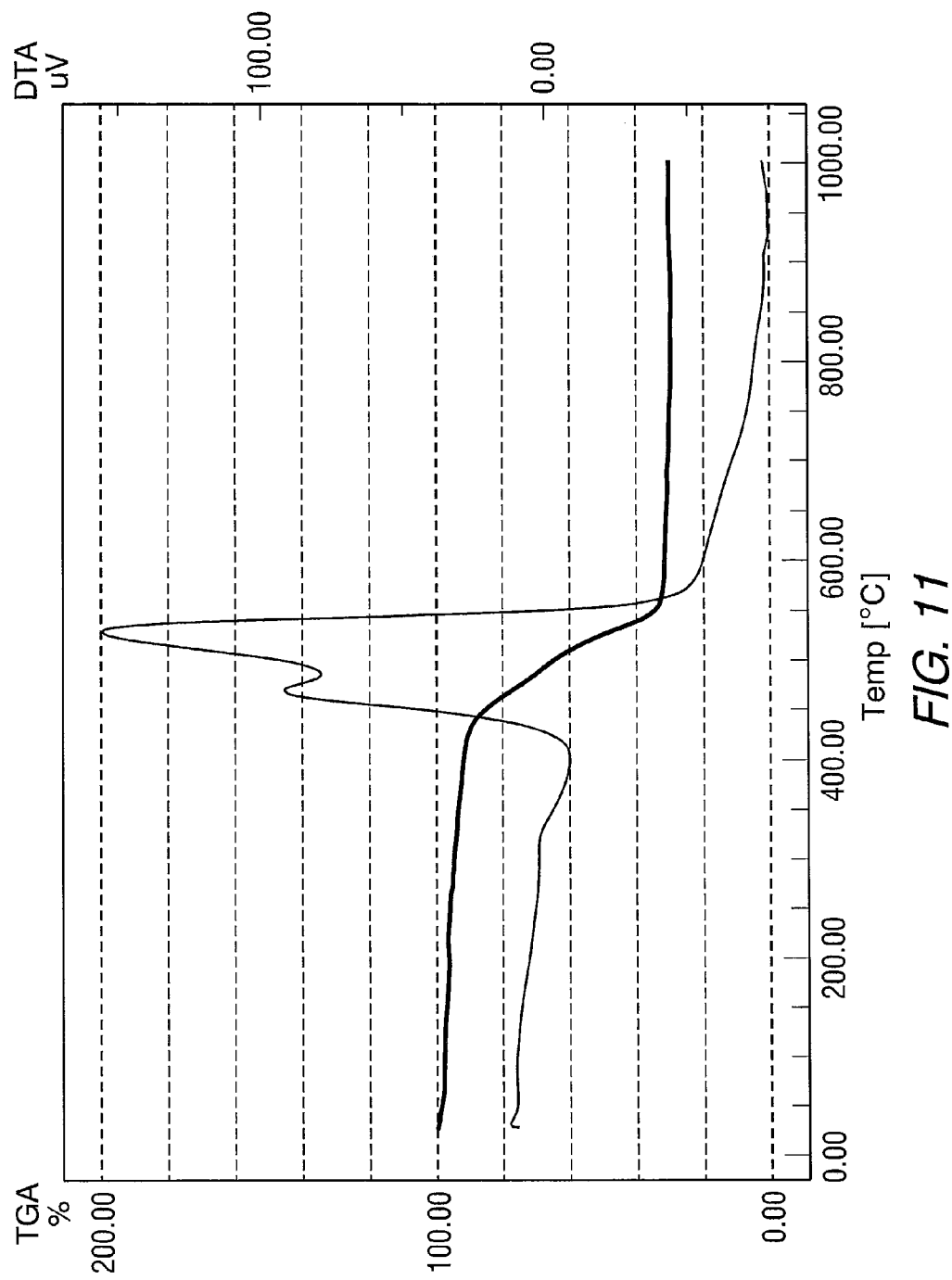
FIG. 11 is a TGA chart of single-walled carbon nanotube after purification according to Example 2.
Figure 12:
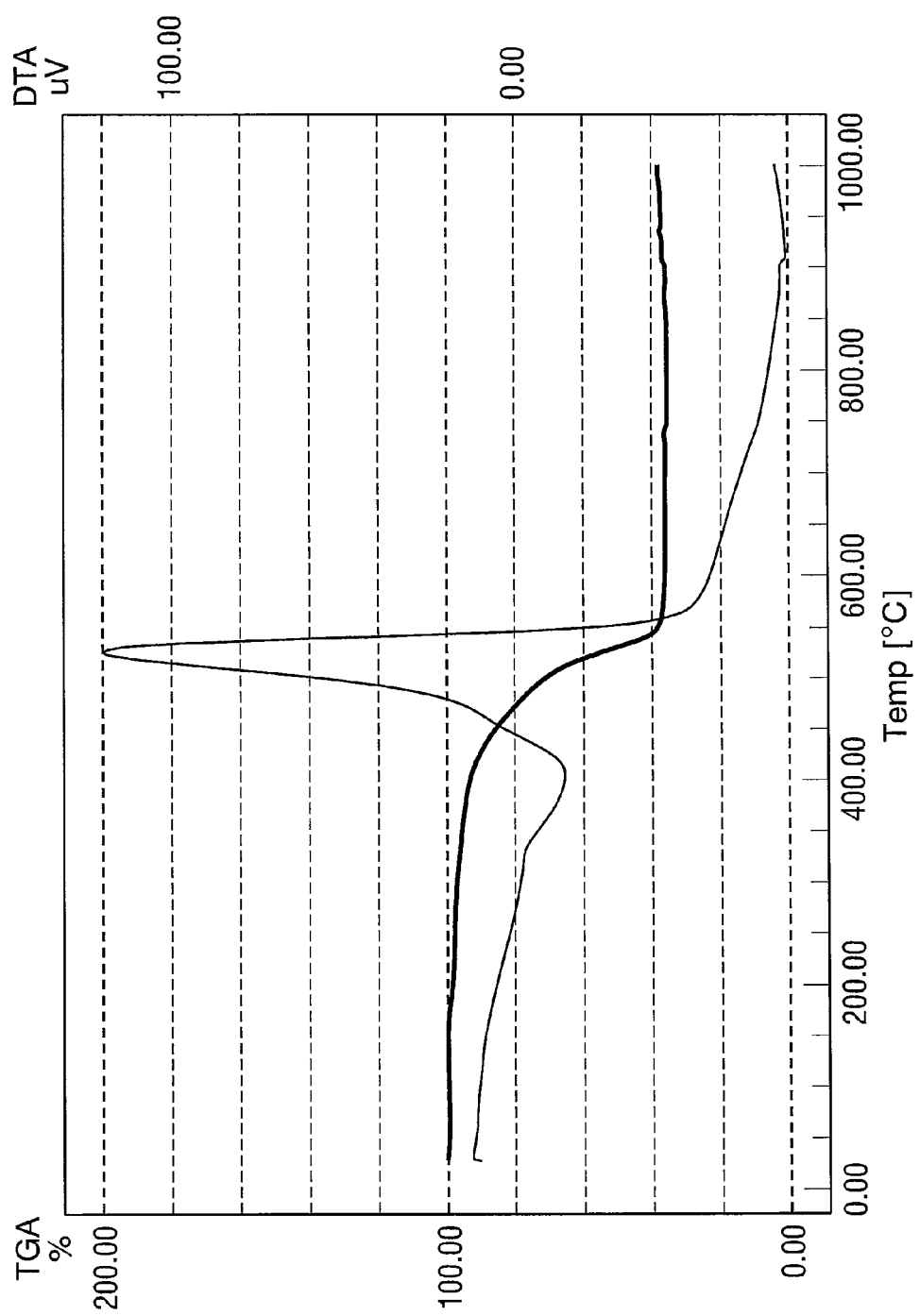
FIG. 12 is a TGA chart of single-walled carbon nanotube after purification according to Example 1.
Figure 13:
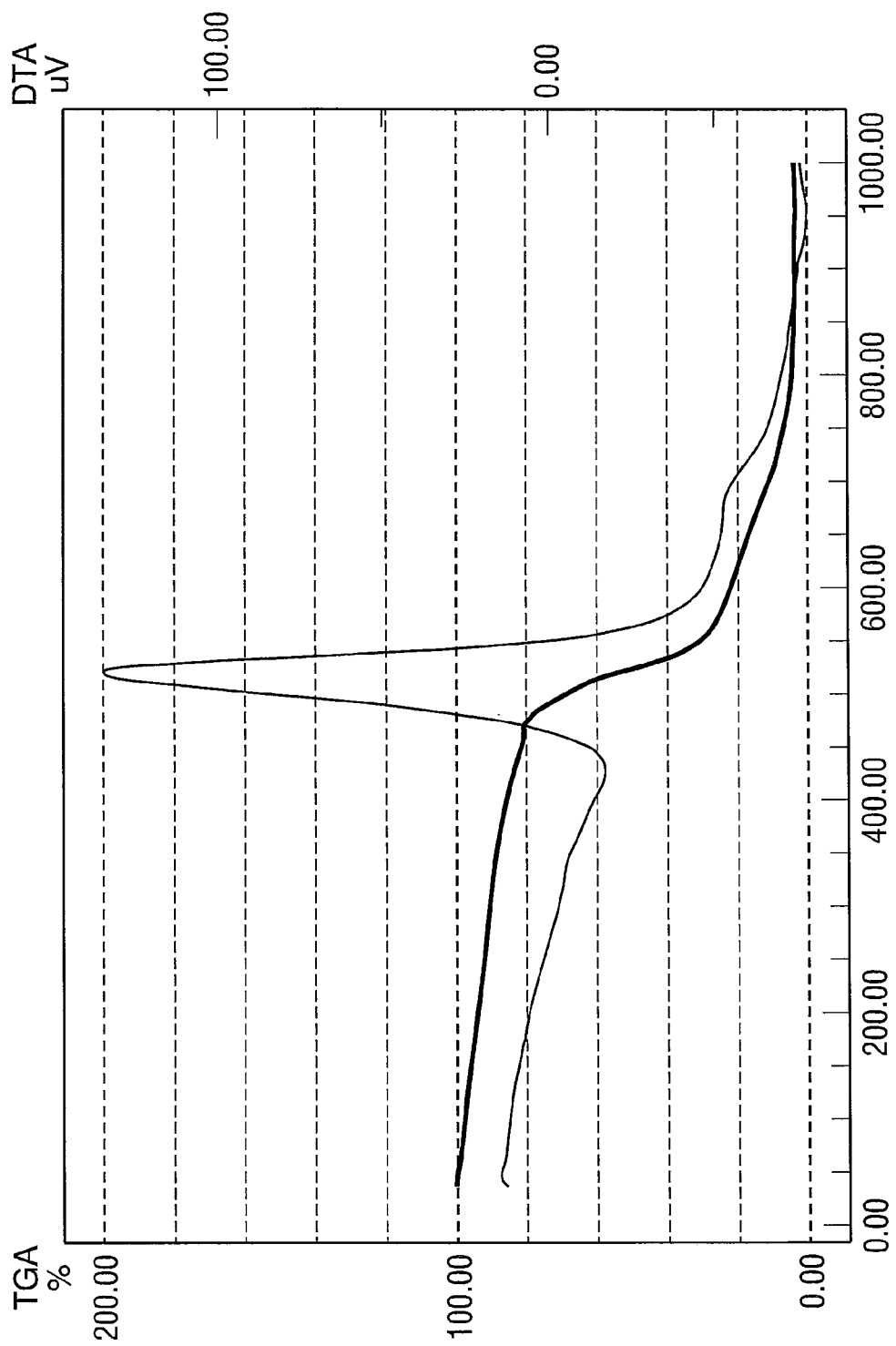
FIG. 13 is a TGA chart of single-walled carbon nanotube after purification according to Example 3.

|  | TEM photograph | TGA measurement | hydrogen peroxide | iron material |
|---|---|---|---|---|
| Comparative Example | FIG. 6 | FIG. 10 | yes | — |
| Example 2 | FIG. 7 | FIG. 11 | yes | iron particles with an average particle size of 2 μm |
| Example 1 | FIG. 8 | FIG. 12 | yes | iron particles with an average particle size of 0.2 μm |
| Example 3 | FIG. 9 | FIG. 13 | yes | iron-containing carbonaceous material |

As may be understood from a comparison of FIGS. 6 to 9, in comparison to the Comparative Example (FIG. 6), which employed only hydrogen peroxide, Examples 1 to 3 (FIGS. 8, 7, and 9), in which hydrogen peroxide and iron material were added, yielded a purified material (purified carbon nanotube) that had been purified to a clearly higher degree than the purified material obtained by the Comparative Example. Among these purified materials, Example 1 (FIG. 8), which used iron particles with a smaller average particle size as the iron material, yielded a purified material of clearly higher quality than that obtained by Example 2 (FIG. 7), which used iron particles with a larger average particle size. In addition, Example 3, which employed an iron-containing carbonaceous material as the iron material, yielded a (highly purified) purified material of much higher quality.

TGA Measurements on the Purified Single-Walled Carbon Nanotube

Thermogravimetric analysis (TGA) was carried out on the purified materials obtained by the preceding examples and the Comparative Example. A TGA instrument from Shimadzu (Model DTG-60M) was used for these TGA measurements. The results (charts) of these measurements are shown in FIGS. 10 to 13. The results of the TGA measurement on the purified material obtained in the Comparative Example are shown in FIG. 10; the results of the TGA measurement on the purified material obtained in Example 2 are shown in FIG. 11; the results of the TGA measurement on the purified material obtained in Example 1 are shown in FIG. 12; and the results of the TGA measurement on the purified material obtained in Example 3 are shown in FIG. 13. The assignment of the individual examples and the Comparative Example to these TGA measurement results is also shown in Table 1.

The peak appearing at a lower temperature (about 470° C.) than the main peak in these TGA measurement results is thought to be caused by the decomposition of amorphous carbon that remains in the purified material. This low-temperature peak is fairly large in the TGA chart for the purified material from the Comparative Example (FIG. 10) and to a lesser degree is clearly seen in the TGA chart for the purified material from Example 2 (FIG. 11). On the other hand, this low-temperature peak is reduced to a trace level in the TGA chart for the purified material from Example 1. Moreover, in the TGA chart for the purified material from Example 3, this low-temperature peak is reduced to the point that it does not appear on the chart. Thus, the results of TGA measurements on the purified materials obtained by the individual examples and the Comparative Example were in good agreement with the results of the TEM observations of the same purified materials.

Observation of the Properties of the Iron-Containing Carbonaceous Material

Figure 14:
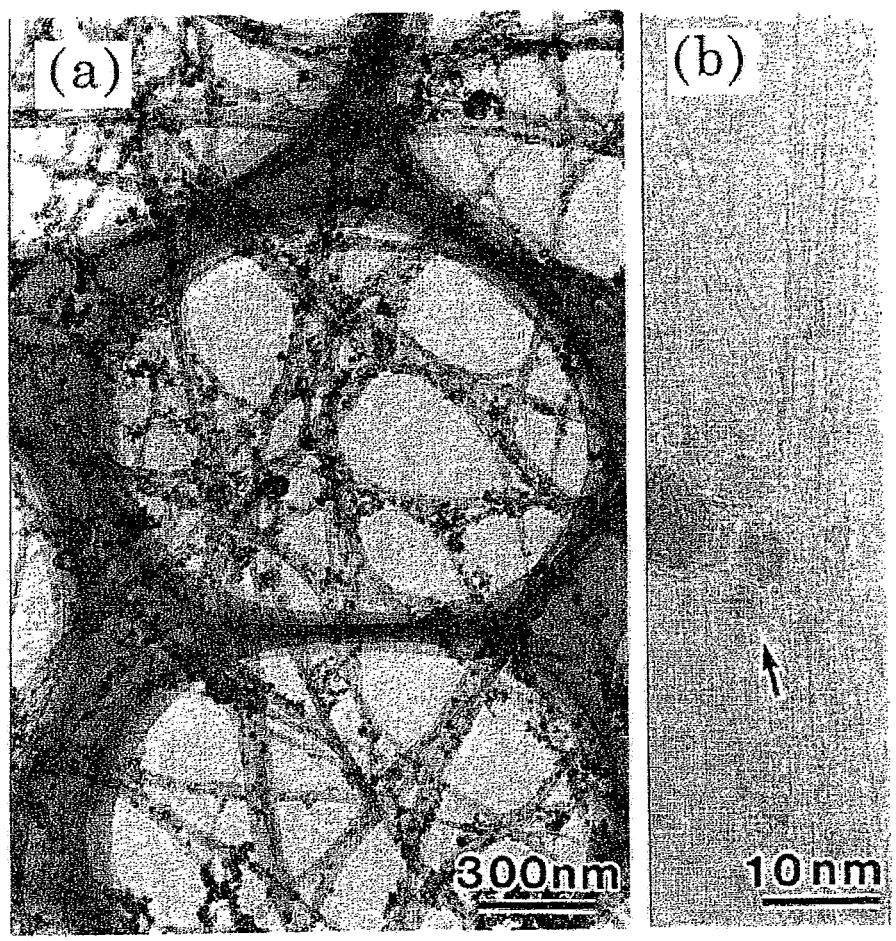
FIGS. 14(a) and 14(b) are TEM photographs of the carbon nanotube-purifying material used in Example 3.

The iron-containing carbonaceous material used as the iron material in Example 3 was submitted to TEM observation. These TEM photographs are shown in FIG. 14(*a*) and FIG. 14(*b*). FIG. 14(*b*) shows an enlarged field from FIG. 14(*a*).

The presentation in FIG. 14(*a*) is of a large number of microscopic iron particles (seen as black points) dispersed on and attached to the surface of the carbon nanotubes that constitute this iron-containing carbonaceous material. These iron particles are well scattered over the carbonaceous material as a whole and are disposed in an approximately uniform manner. That is, they are thinly scattered without significant aggregation. The average particle size of these iron particles is in the range of about 5 nm to 10 nm.

The presentation in FIG. 14(*b*) is of the aforementioned iron particles carrying a thin coating of amorphous carbon. The average thickness of the amorphous carbon coating the iron particles is about 2 nm to 5 nm. This thin amorphous carbon layer can be easily removed by an oxidation treatment (for example, treatment with hydrogen peroxide). This serves to expose the inner iron particle. Example 3 presumably yielded its highly purified carbon nanotube (purified material) through the efficient oxidative elimination of the impurities in the purification target by such iron particles and the hydrogen peroxide.

What is claimed is:

1. A method for producing purified carbon nanotube comprising:
   providing a carbonaceous material comprising carbon nanotube and not comprising iron; and
   purifying the carbon nanotube by adding an iron-containing material and hydrogen peroxide to the carbonaceous material to facilitate removal of impurities present in the carbonaceous material,
   wherein the iron-containing material is an iron-containing carbonaceous material obtained by striking an arc discharge between a pair of electrodes, wherein at least the positive electrode is an iron-containing carbon molding, and causing the deposition of evaporated material produced from the positive electrode.

2. The method according to claim 1, wherein the carbon molding contains at least one metal selected from the group consisting of nickel (Ni), cobalt (Co), and the platinum group elements or contains an alloy mainly of the meta.

3. The method according to claim 1, wherein the iron-containing carbonaceous material contains iron particles with an average particle diameter of 100 nm or less.

4. The method according to claim 1, further comprising adding an inorganic acid component.

5. The method according to claim 1, further comprising mixing the carbonaceous material and the iron-containing material with a solvent to form a dispersion prior to adding the hydrogen peroxide.

6. The method according to claim 5, further comprising heating the dispersion after addition of the hydrogen peroxide.

7. The method according to claim 6, further comprising separating the purified carbon nanotubes from the dispersion.

\* \* \* \* \*

UNITED STATES PATENT AND TRADEMARK OFFICE
CERTIFICATE OF CORRECTION

| | | |
|---|---|---|
| PATENT NO. | : 9,067,793 B2 | Page 1 of 1 |
| APPLICATION NO. | : 13/225888 | |
| DATED | : June 30, 2015 | |
| INVENTOR(S) | : Andoet et al. | |

It is certified that error appears in the above-identified patent and that said Letters Patent is hereby corrected as shown below:

In the claims

Column 20, Line 33, Claim 2, delete "meta." and insert -- metal. --

Signed and Sealed this
Twenty-second Day of December, 2015

Michelle K. Lee
*Director of the United States Patent and Trademark Office*